United States Patent [19]

Jefferson

[11] 4,282,604
[45] Aug. 4, 1981

[54] OPTICAL ISOLATION CIRCUIT FOR BIDIRECTIONAL COMMUNICATION LINES

[76] Inventor: William T. Jefferson, 113 Taylor St., Chapel Hill, N.C. 27514

[21] Appl. No.: 27,169

[22] Filed: Apr. 4, 1979

[51] Int. Cl.$^3$ .............................................. H04B 9/00
[52] U.S. Cl. .................................. 455/602; 250/551; 307/311
[58] Field of Search ................ 250/199, 551; 307/311; 455/612, 602

[56] References Cited

U.S. PATENT DOCUMENTS

| | | | |
|---|---|---|---|
| 3,402,297 | 9/1968 | Harris | 250/199 |
| 3,410,961 | 11/1968 | Slana | 307/311 |
| 3,902,060 | 8/1975 | Neuner et al. | 250/199 |
| 3,912,951 | 10/1975 | Kihara | 250/551 |
| 3,970,784 | 7/1976 | Meijerink | 250/199 |
| 3,987,257 | 10/1976 | Place | 250/199 |
| 4,056,719 | 11/1977 | Waaben | 250/199 |

OTHER PUBLICATIONS

Longacre—Opto–Isolators Couple CRT Terminals to Printers Lines—Electronics, Oct. 2, 1975, p. 118.
Nielsen—Matched Optical Couplers Stabilize Isolation Circuit—Electronics, vol. 48, #10, May 15, 1975, pp. 98-99.
Morrison et al.—A Linear Opto–Isolator–Conf. on Hybrid Microelectronics Loughborough Leics Eng.—Sep. 9-11, 1975, pp. 117-126.

Primary Examiner—Joseph A. Orsino, Jr.
Attorney, Agent, or Firm—Lowe, King, Price & Becker

[57] ABSTRACT

In an improved optical isolator circuit for interfacing a modem or other data transceiver and the telephone lines, first and second optical paths are established by pairs of semiconductor, optical couplers connected between the modem and telephone lines. While the first optical path carries outgoing data from the modem to the lines, negative feedback on the second optical path provides bias stabilization of the optical couplers and associated circuitry. Similarly, while the second optical path carries data incoming from the lines, there is stabilizing, negative feedback on the first optical path. A high open loop gain, closed loop circuit strategy incorporated in the isolator provides wide band, linear operating characteristics without matched optical couplers.

10 Claims, 1 Drawing Figure

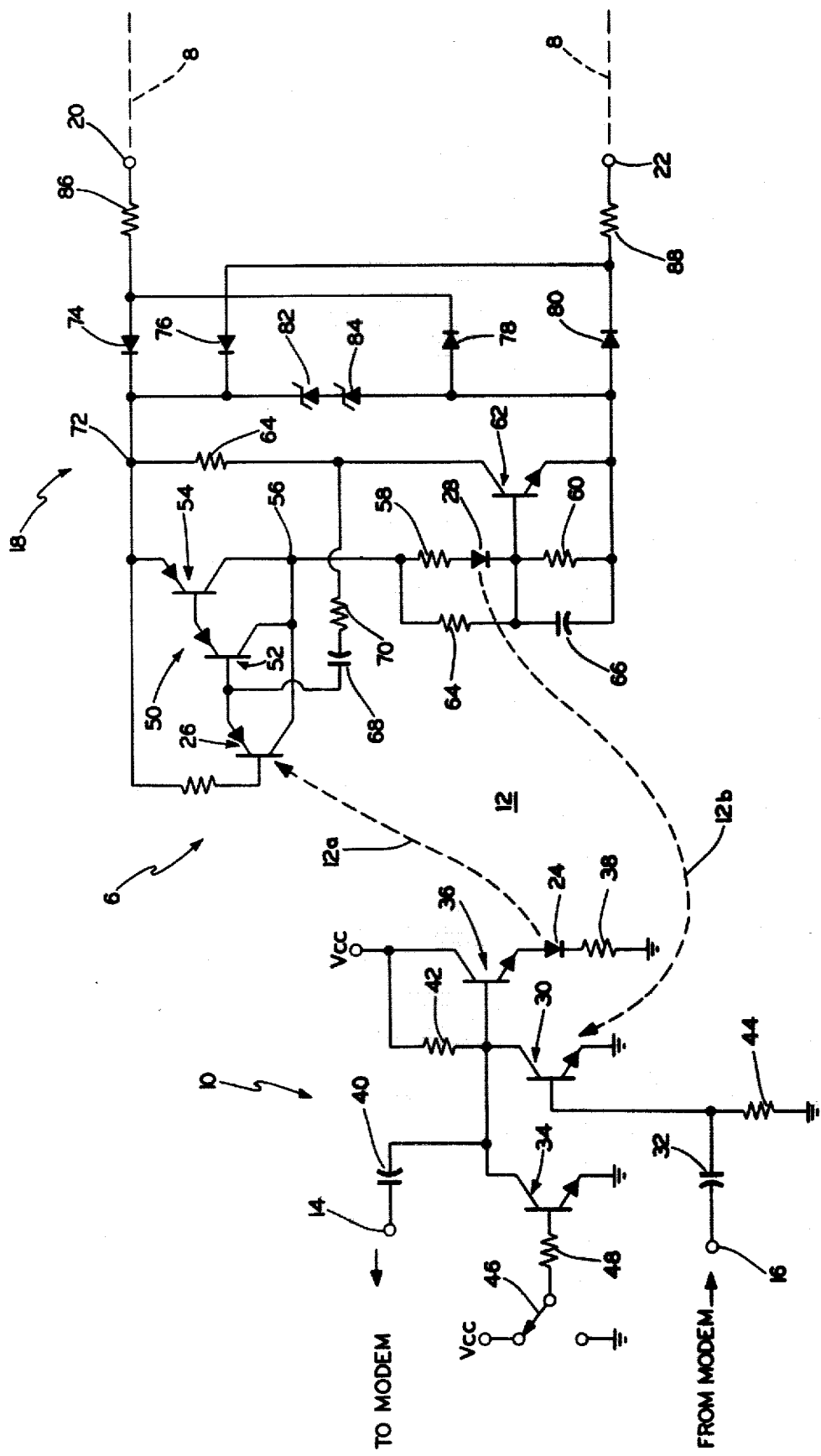

OPTICAL ISOLATION CIRCUIT FOR BIDIRECTIONAL COMMUNICATION LINES

FIELD OF THE INVENTION

The present invention relates generally to isolator circuitry for interfacing transceivers and bidirectional communication lines, and more particularly to optical isolators for interfacing high bit rate data transceiving equipment to the commercial dial telephone network.

BACKGROUND OF THE INVENTION

Data transmitting and receiving equipment, such as the standard telephone, have been commonly interfaced to the commercial telephone lines using a 600 ohm transformer and a relay to electrically isolate the equipment from the lines. Although generally satisfactory for voice signals, transformer coupling is unsuited for high bit rate data transmission because the high frequency response of the transformer is limited by interwire capacitance. Furthermore, the core of the transformer must be quite large, on the order of several inches square, to prevent saturation under the relatively high DC current that will pass through the transformer coil from the 48 volt source on the telephone lines. The relay, which is often packaged together with the transformer, further increases the size of the interface and reduces its overall reliability because the relay contacts tend to wear and corrode with time and there are problems with vibration and contact bouncing during closing.

In order to eliminate the transformer and relay, electrical isolation from the telephone lines has more recently been provided by acoustic coupling, wherein electrical signals representative of voice or binary data are converted to high frequency sound waves in a transducer and acoustically coupled to the telephone transmitter. Incoming corresponding signals on the telephone lines are converted to acoustic signals at the interface and acoustically coupled to the receiver.

Whereas transformer or acoustic coupling has a frequency response that is generally sufficient for voice communications, each is insufficient for interfacing with telephone lines modems (modulator-demodulator units) that transmit and receive digital signals and enable communication between computers on the telephone lines. The modem carrier frequencies, even for high speed modems, is still within the voice band 300 Hz-3 KHz. The switched network simply will not pass higher or lower frequency components.

Accordingly, one object of the present invention is to provide a new and improved optical interface for electrically isolating equipment from a set of communication lines.

Another object is to provide a telephone line isolation circuit that has improved high frequency phase and amplitude response as well as improved linearity.

Another object is to provide a new and improved telephone line isolation circuit that uses solid state components for increased reliability and negative feedback for improved stability.

In order to increase the high frequency response of telephone line isolation couplers, it has been proposed to use light emitting diode (LED) and light responsive transistor (LRT) pairs as the isolation elements for interfacing the modem and telephone lines. Presently available telephone line optical isolators, however, exhibit strong non-linear characteristics which present problems in telephone line interfacing in view of strict specifications promulgated by the telephone companies. U.S. Pat. No. 4,056,719 to Waaben, for example, discloses an optical coupler for interfacing equipment with the telephone lines that provides separate optical coupling paths for transmission and reception. Optical coupling of data along each of the optical paths is provided by an LED/LRT pair, wherein each LED is driven by an associated driver amplifier responsive to electrical signals generated by the modem or to incoming electrical signals on the lines. Optical feedback from each LED to the input of its associated amplifier helps improve the linearity of the LED, although the overall stability and frequency response of the interface are not substantially improved because the data and feedback paths are separate; negative feedback for bias stabilization is limited to only the individual LEDs and associated driver amplifiers and does not intersect the LRTs and associated circuitry of the interface. In practice, however, to maintain a high degree of stability, the data and feedback optical paths must be matched precisely and this requires matching the LEDs and LRTs associated with each incoming or outgoing signal path. Because there is negative feedback only between the input and output of each LED driver amplifier, the transfer characteristics of the optical devices, which tend to change as a function of temperature and aging, degrade the long term stability of the interface.

Another object of the invention, therefore, is to provide an optical isolation circuit for interfacing equipment and the telephone lines, wherein variations in component characteristics as a function of temperature, aging or other factors are compensated.

Another object is to provide a new and improved optical isolation circuit for interfacing data transceiving equipment and the telephone lines, wherein data and feedback are both optically coupled along common optical paths for improved circuit stability.

Another object is to provide a new and improved optical isolation circuit for interfacing data transceiving equipment and the telephone lines which satisfies commercial telephone line impedance characteristics independently of telephone line voltage or line impedance.

SUMMARY OF THE INVENTION

An isolation circuit for interfacing data transceiving equipment, such as modems, and the telephone lines or other bidirectional communication lines, comprises a first LED (light emitting diode) electrically coupled to the modem to be modulated in response to the transmitted signal. Light generated by the LED is transmitted along a first optical path to a corresponding first LRT (light responsive transistor) electrically coupled to the communication lines. The LRT, which forms the input stage of a Darlington circuit, converts the received light to an electrical signal that is generated on the telephone lines as an outgoing signal and also modulates a second LED. Light generated by the second LED is fed back along a second optical path to a second LRT that is electrically coupled to the input of the modem as well as to the first LED, completing a closed loop.

During transmission of data by the modem onto the telephone lines, the outgoing signal is coupled to the base of the second LRT on the modem side of the interface. The output of the LRT modulates the first LED through a driver transistor. Light, which is a replica of the modem signal, is coupled along the first optical path to be detected by the first LRT connected in circuit on the telephone lines. The signal generated by the first LRT is amplified by the Darlington stages and impressed onto the telephone lines through an output transistor. The Darlington signal also modulates the output of the second LED which is optically coupled through the second optical path to the second LRT. A closed loop for outgoing signals is thus established that includes all four optical devices and both optical paths. The high gain of the Darlington stages together with the common signal and feedback loops establishes a very precisely controlled operating point for the optical components as well as for associated transistors.

The output transistor across the telephone line is operated as a current source so that the amount of current drawn by the interface from the telephone lines is independent of telephone line voltage and line impedance. Also, the output impedance of the interface circuitry is constant for precise matching with the impedance characteristics of the lines.

In response to signals incoming on the telephone lines, the Darlington circuit is controlled to modulate the output of the second LED on the communication lines. The output of the LED, which is a replica of the incoming signal, is optically coupled along the second optical path to the second LRT to be electrically coupled to the input of the modem. The second LRT further modulates the output of the first LED that is also responsive to the output of the modem. Thus, a closed loop for incoming signals is established which includes all four optical devices as well as both optical paths between the modem and telephone lines.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWING

The FIGURE is a schematic diagram showing a circuit for optically isolating a data transceiver such as a modem and the telephone lines in accordance with the principles of the present invention.

BRIEF DESCRIPTION OF A PREFERRED EMBODIMENT

Referring to the FIGURE, optical isolation circuit 6 for interfacing a modem (not shown) to a pair of telephone lines 8 comprises a first circuit 10 at one end of an isolation region 12 connected to supply incoming signals to the modem at terminal 14 and to receive outgoing signals from the modem at terminal 16. As an overview, incoming and outgoing signals are optically coupled through the isolation region 12 to a circuit 18 electrically connected to the commercial telephone lines 8 at terminals 20 and 22. Signals generated by the modem originate at the terminal 16 and are coupled to the telephone lines 8 over a first optical path 12a, whereas signals incoming from the telephone lines are coupled to the modem over the second optical path 12b. In accordance with the invention, and as described below in detail, data signals incoming on optical path 12b are accompanied by corresponding optical feedback on the other optical path 12a for bias stabilization. Similarly, outgoing data signals on optical path 12a are accompanied by corresponding optical feedback on path 12b. The data signals generated between the modem and telephone lines 8 in either direction are typically sinusoidal carrier signals.

The optical components in the circuits 10 and 18 on opposite ends of isolation region 12 are conventional light emitting diodes (LEDs) and light responsive transistors (LRTs) typically mounted in close proximity to each other in a common, small package. LEDs are semiconductor diodes that have pn junctions which are fabricated to generate light having an intensity that is a function of junction current. LRTs are transistors that have light responsive base-to-emitter junctions. The LRTs are capable of operating in a conventional transistor mode in response to base current as well as in a light responsive mode.

The optical components in circuits 10 and 18 referred to above comprise a first LED 24 at the modem end 10 of optical path 12a which generates light having an intensity related to the magnitude of current flowing through it. The light generated by LED 24 is received by a first LRT 26 electrically connected in circuit 18 on the telephone lines end of the optical path 12a. The LRT 26 conducts collector current that is a function of two variables, i.e., the magnitude of its base current and the intensity of light supplied to its optically exposed base-to-emitter junction. A second LED 28 in circuit 18 is optically coupled along the second optical path 12b to a second LRT 30 in circuit 10. The LRT 30 is similar to LRT 26 in circuit 18, that is, its collector current is responsive to both its base current and to the intensity of incoming light from LED 28.

Referring now to the FIGURE in more detail, a capacitor 32 is connected between modem terminal 16 and the base of LRT 30. The collector of LRT 3 as well as the collector of a switching transistor 34 is connected to the base of a driver transistor 36. The collector of transistor 36 is connected directly to a source $V_{CC}$ of DC voltage and is operated as an emitter follower with a load comprising the LED 24 and a current limiting resistor 38. Also connected to the base of driver transistor 36 is another capacitor 40 that is coupled to modem terminal 14. Bias current is supplied to the base of driver transistor 36 through biasing resistor 42 connected between source $V_{CC}$ and the base of the transistor. Another resistor 44 is connected between the base of LRT 30 and ground to provide a path to ground for collector to base leakage current and a discharge path for capacitor 32.

The switching transistor 34 enables the circuits 10 and 18 to selectively "capture" the telephone lines 8 or release them depending on the requirements of the modem (not shown). The base of transistor 34 is connected to a modem switch 46 through current limiting resistor 48 which connects the base of transistor 34 to the voltage source $V_{CC}$ when the modem is "on-hook" or disconnected and to ground when the modem is "off-hook" or connected. When the modem is on-hook, with switch 46 connected to $V_{CC}$, transistor 34 is saturated to maintain the base of driver transistor 36 as well as the collector of transistor 30 at nearly ground potential and thereby switch the driver 36 "off". In this condition, no current passes through LED 24 and no optical signal is accordingly received by LRT 26 causing the circuits 10 and 18 to be dormant. When the modem is off-hook, on the other hand, with switch 46 connected to ground, transistor 34 is turned off, releasing the base of transistor 36 as well as the collector of LRT 30. In that condition, LED 24 current is controlled by the emitter current of driver 36 which is responsive to signals generated by the modem.

Within circuit 18 at the telephone lines end of optical paths 12, LRT 26 constitutes the input stage together with PNP transistors 52 and 54 of a three transistor Darlington circuit 50. LRT 26 may be provided by an optically coupled SCR connected as a PNP transistor to ensure a sufficiently high $V_{CEO}$ breakdown characteristic to meet telephone company specifications. The three transistors 26, 52 and 54 constituting the Darlington 50 have a common collector connection at 56 in series with LED 28 and biasing resistors 58 and 60.

Also connected across the lines 8 are output driver transistor 62 in series with collector resistor 64. The base of transistor 62 is connected between LED 28 and resistor 60 as well as between resistor 64 and capacitor 66. Resistors 58 and 64 form a current divider network around LED 28 to cause some of the current to flow through the LED and the remainder of the current to flow through resistor 64. The purpose of the current divider is to cause LED 28 to have a longer lifetime by biasing it at the lower current level. Capacitor 66 ensures that no AC voltage will develop across the base-emitter junction of transistor 62.

A capacitor 68 and resistor 70 are connected between the base of transistor 52 and the collector of driver transistor 62 to couple AC signals from the telephone lines 8 to the Darlington 50. Thus, AC signals incoming on the lines 8 are coupled to the Darlington stages 50 to be superimposed with any optical signals impinging on the LRT 26 from LED 24.

A positive voltage source for operating circuit 18 derived from the positive or negative DC voltage on telephone lines 8 is established at 72 through a full-wave rectifier comprising diodes 74, 76, 78 and 80. Zener diodes 82 and 84 provide voltage limiting across circuit 18 and protect against voltage transients that may be developed on the telephone lines. Additional resistors 86 and 88 in series, respectively, with terminals 20 and 22 of the telephone lines together with load resistor 64 provide impedance matching of circuit 18 to the lines 8.

In operation, assuming first that a signal is applied from the modem at input terminal 16 to be communicated to the telephone lines 8, the modem switch 46 is pivoted from $V_{CC}$ to ground, turning off switching transistor 34 to release the collector of LRT 30 and the base of driver transistor 36. The data carrier signal generated by the modem is coupled to the base of LRT 30 through capacitor 32. The collector of LRT 30 which is responsive to the modem signal controls the base current of driver transistor 36 that in turn modulates the output intensity of LED 24.

The LRT 26 in circuit 18, which is optically coupled to the output of LED 24 along path 12a, converts the optical signal to an electrical signal and greatly amplifies the electrical signal through Darlington stages 50. The amplified signal is supplied to the base of load driver transistor 62 through resistors 58 and 64 as well as LED 28. The DC portion of this signal turns on transistor 62 causing it to saturate, the AC portion being bypassed around transistor 62 by capacitor 66. With transistor 62 saturated, resistor 64 is effectively connected across the telephone lines 8 thereby terminating them in the proper impedance.

Light generated by LED 28 in response to the collector current from transistor 54 is fed back to LRT 30 along optical path 12b, to modulate LRT 30 which controls the biasing of driver transistor 36. There is thus a closed loop that is established to maintain substantially constant the quiescent operating points of LEDs 24 and 28 as well as of LRTs 26 and 30 and associated transistors 36, 52, 54 and 62.

Because the open loop gain of the system is very high (on the order of several hundreds), the closed loop characteristics cause the operating points of the devices to be substantially independent of transient parameter variations as well as of long term variations, such as aging.

Signals incoming on the telephone lines 8 are passed through bridge diodes 74–80 to be impressed across the load resistor 64 in circuit 18 to the collector of transistor 62, the biasing of transistor 62 being provided by LED 28 as well as by resistors 64, 58 and 60. The signal on the collector of transistors 62 is coupled to the base of transistor 52 through resistor 70 and capacitor 68. This signal is greatly amplified by transistors 52 and 54 and supplied to modulate the output of LED 28.

LRT 30 in circuit 10 is responsive to the light output of LED 28 coupled on path 12b to develop a collector signal which is a replica of the incoming signal on lines 8. The signal on the collector of LRT 30 is coupled to the modem at terminal 14 through capacitor 40.

The collector of LRT 30 also controls the base current of driver transistor 36 which in turn modulates the output of LED 24. The output of LED 24 is optically coupled over path 12a to LRT 26 and Darlington stages 50 in circuit 18 as negative feedback for bias stabilization in the manner described above with respect to signal outgoing from the modem to the lines 8.

Thus, there are closed loop circuits established for stabilization and linearization with respect to bidirectional signal transmission, wherein each optical path 12a, 12b will carry, respectively, a fed forward data signal and a bias stabilizing feedback signal for outgoing transmissions and vice versa for incoming transmissions. In either case, a single, high gain loop intersects all active components assuring peak stability and linearity without requiring component matching and without the complexity of any additional LRTs associated with multiple loop circuits of the prior art. Furthermore, negative feedback associated with the closed loop architecture of the invention which incorporates DC feedback as well as AC signal transmission in common paths causes the optical devices to be operative within very small operating regions for significantly improved circuit linearity and frequency range.

The output of Darlington amplifier 50 functions as a current source (e.g., 20 ma.) at a magnitude designed to be compatible with the requirements of the telephone companies. See e.g., "Off-Hook Tip to Ring Voltage Versus Current Characteristics", *Electrical Characteristics of Bell System Network Facilities at the Interface with Voiceband Ancillary and Data Equipment*, FIG. 3, Bell System Technical Reference PUB 47001, 1978. The high output impedance of the Darlington 50 does not significantly affect the output impedance of circuit 18 constituted by resistors 86, 64, 88, matched to the impedance of the telephone lines 8.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, although the present invention has been described with respect to interfacing a modem with the commercial lines, it is to be understood that the isolation circuitry disclosed herein has general application with respect to unidirectional or bidirectional coupling of any data transfer equipment and communication lines.

What I claim is:

1. An isolation circuit for interfacing a data transceiver and a set of bidirectional communication lines, comprising:
   a first light emitting device responsive to electrical signals generated by said transceiver;
   a first light responsive transistor having a control terminal electrically coupled to said communication lines, a first optical path being established between said first light emitting device and said first light responsive transistor;
   a second light emitting device responsive to incoming signals on said communication lines and to said first light responsive transistor; and
   a second light responsive transistor having a control terminal electrically coupled to said transceiver, said first light emitting device being further responsive to said second light responsive transistor;
   each one of said optical paths carrying negative feedback derived from data signals in the other one of said optical paths.

2. The circuit of claim 1, wherein said first and second light emitting devices comprise light emitting diodes.

3. The circuit of claim 2, including a first transistor for controlling said first light emitting diode, said first transistor being responsive to an output of said second light responsive transistor.

4. The circuit of claim 3, wherein said first light responsive transistor forms an input of a Darlington amplifier circuit.

5. The circuit of claim 4, said circuit further comprising a second transistor for driving the communication lines, wherein said second light emitting diode and said second transistor are responsive to an output of said Darlington amplifier.

6. An isolation circuit for interfacing a data transceiver and a set of bidirectional communication lines, comprising:
   a first light emitting device electrically coupled to an output of said transceiver and responsive to signals generated by said transceiver;
   a first light responsive transistor having a control terminal electrically coupled to said communication lines, a first optical path being established between said first light emitting device and said first light responsive transistor;
   a second light emitting device electrically coupled to said communication lines, said second light emitting device being responsive to incoming signals on said lines and to said first light responsive transistor; and
   a second light responsive transistor having a control terminal electrically coupled to an input of said transceiver and to said first light emitting device, a second optical path being established between said second light emitting device and said second light responsive transistor;
   one of said first and second optical paths carrying a data signal between said transceiver and communication lines, the other one of said paths carrying a negative feedback signal derived from said data signal.

7. An isolation circuit for interfacing a transceiver and a set of bidirectional communication lines, comprising
   a first light emitting means electrically coupled to an output to said transceiver;
   a first light responsive transistor having a control terminal electrically coupled to said communication lines, said first light emitting means and said first light responsive transistor being optically coupled together along a first optical path; a second light emitting means electrically coupled to said communication lines and to said first light responsive means;
   a second light responsive transistor having a control terminal electrically coupled to an input of said transceiver and to said first light emitting means; said second light emitting means and said second light responsive transistor being coupled together along a second optical path;
   means responsive to an outgoing signal on said first optical path for generating a first bias stabilization, feedback signal on said second optical path; and
   means responsive to an incoming signal on said second optical path for generating a second bias stabilization feedback signal on said first optical path.

8. An isolation circuit for interfacing a data transceiver and a set of bidirectional communication lines, comprising:
   a first light emitting device responsive to outgoing electrical signals generated by said transceiver;
   a first light responsive amplifier electrically coupled to said communication lines, a first optical path being established between said first light emitting device and said first light responsive amplifier, said first light emitting device and said first light responsive amplifier having highly non-linear gain characteristics and together establishing a high open loop forward gain to the outgoing signals;
   a second light emitting device responsive to incoming signals on said communication lines and to said first light responsive amplifier; and
   a second light responsive amplifier electrically coupled to said transceiver, said first light emitting device being further responsive to said second light responsive amplifier, said second light emitting device and said second light responsive amplifier having highly non-linear gain characteristics and together establishing a high open loop forward gain to the incoming signals;
   each one of said optical paths carrying a.c. and d.c. negative feedback derived from data carrier signals in the other one of said optical paths to establish approximately unity closed loop gain for the incoming signals and outgoing signals for linearization of said incoming and outgoing signals as well as for bias point stabilization of said first and second light emitting and light responsive amplifiers.

9. The circuit of any of claims 1, 6 or 7, including a current source means electrically coupled to said communication lines, and means for modulating said current source means in response to outgoing data carrier signals on said first optical path.

10. An isolation circuit for interfacing a data transceiver and a set of bidirectional communication lines comprising:
- a first light emitting device responsive to electrical signals generated by said transceiver;
- a first light responsive device electrically coupled to said communication lines, a first optical path being established between said first light emitting device and said first light responsive device;
- a second light emitting device responsive to incoming signals on said communication lines and to said first light responsive transistor;
- a second light responsive device electrically coupled to said transceiver, said first light emitting device being further responsive to said second light responsive device;
- each one of said optical paths carrying negative feedback derived from data signals in the other one of said optical paths; and
- a current source directly electrically connected to said communication lines, and means for modulating said current source means in response to outgoing data carrier signals on said first optical path.

* * * * *